United States Patent [19]

Nagumo et al.

[11] 3,943,711
[45] Mar. 16, 1976

[54] MULTI-STAGE AIR PUMP FOR SUPPLYING SECONDARY AIR INTO AN EXHAUST GAS PURIFICATION SYSTEM

[75] Inventors: Shin-ichi Nagumo; Yasuo Nakajima, both of Yokosuka; Yoshimasa Hayashi; Kunihiko Sugihara, both of Yokohama, all of Japan

[73] Assignee: Nissan Motor Company Limited, Yokohama, Japan

[22] Filed: Apr. 12, 1974

[21] Appl. No.: 460,471

[30] Foreign Application Priority Data
Apr. 13, 1973  Japan.......................... 48-43681[U]

[52] U.S. Cl. ..................... 60/301; 60/306; 60/307
[51] Int. Cl.² ............................................. F01N 3/16
[58] Field of Search ............ 60/307, 306, 290, 289, 60/286, 301; 417/251

[56] References Cited
UNITED STATES PATENTS

| | | | |
|---|---|---|---|
| 2,703,477 | 3/1955 | Anxionnaz | 60/262 |
| 3,226,206 | 12/1965 | Hettich | 60/286 |
| 3,826,089 | 7/1974 | Nakajima | 60/290 |

FOREIGN PATENTS OR APPLICATIONS

| | | | |
|---|---|---|---|
| 876,212 | 9/1940 | France | 417/251 |

*Primary Examiner*—Douglas Hart

[57] ABSTRACT

A plurality of pump elements is progressively increasing the pressure of air to respectively supply air at various pressures into portions in an exhaust gas purifying system requiring secondary air.

2 Claims, 1 Drawing Figure

U.S. Patent   March 16, 1976   3,943,711
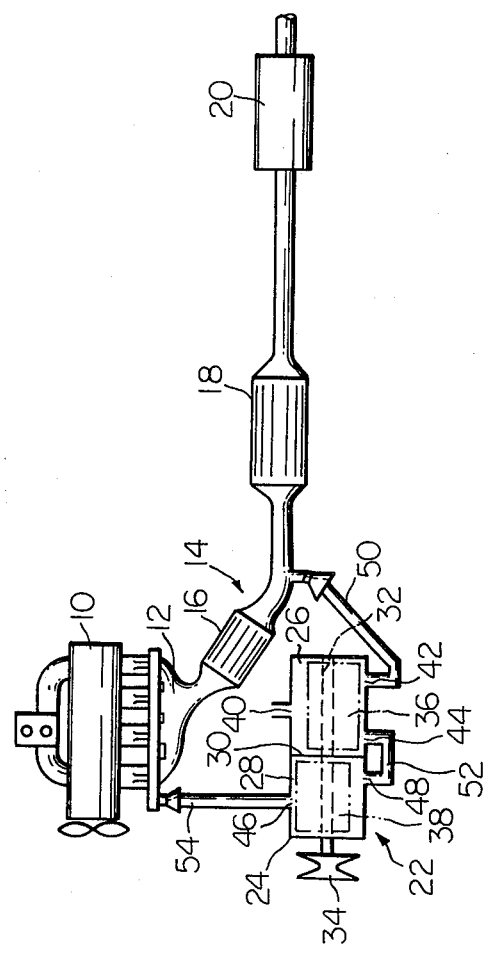

MULTI-STAGE AIR PUMP FOR SUPPLYING SECONDARY AIR INTO AN EXHAUST GAS PURIFICATION SYSTEM

The present invention relates to a multi-stage air pump for supplying secondary air into an exhaust gas purifying system of an internal combustion engine to convert noxious and harmful components into harmless ones before the exhaust gases are emitted from the exhaust system.

It is well known that a modern motor vehicle can be equipped with an exhaust purifying system having in series an exhaust manifold equipped with an afterburning device for oxidizing considerable amounts of oxidizable noxious components such as nitrogen oxides and hydrocarbons etc., a reducing catalytic converter for reducing nitrogen oxides, and an oxidizing catalytic converter for completely oxidizing the oxidizable noxious components.

In this purifying system, an air pump is employed for supplying secondary air both upstream of the oxidizing catalytic converter which is subjected to relatively low exhaust back pressure and the exhaust manifold which is subjected to relatively high exhaust back pressure.

In order to supply the required amount of secondary air from one air pump into the above-mentioned two portions which are subjected to different back pressures, an orifice for flow restriction is disposed in a conduit connecting the air pump and a location upstream of the oxidizing catalytic converter which is subjected to lower exhaust back pressure than the exhaust manifold.

However, in this purifying system, difficulties are encountered in that the prior art air pump is subjected to high discharge resistance due to the abovementioned orifice. This resistance results in too heavy load for the air pump and therefore decreases the life thereof.

It is therefore an object of the present invention to provide a multi-stage air pump for an exhaust gas purifying system in which the air pump overcomes the above-mentioned shortcomings.

It is another object of the present invention to provide a multi-stage air pump for an exhaust purifying system in which no orifice within a secondary air supply pipe is required.

These and other objects and advantages of the present invention will become apparent from the following description when taken in conjunction with the attached drawing, in which:

The single FIGURE is a schematic diagram showing an exhaust gas purifying system of an internal combustion engine which incorporates an air pump according to the present invention.

Referring now to the drawing, there is shown an internal combustion engine 10 having an exhaust manifold 12 which is connected to an exhaust purifying system 14. The purifying system 14 comprises in series a reducing catalytic converter 16 and an oxidizing catalytic converter 18 which in turn connects to a muffler 20. The purifying system 14 further comprises an air pump 22 of the present invention which supplies secondary air for oxidation of oxidizable noxious components in the exhaust gases.

The air pump 22 comprises a housing 24 which includes a first stage element 26 and a second stage element 28 which are separated from each other by a partition 30 but are fluidly connected in series to each other. A drive shaft 32 is rotatably disposed along the longitudinal axis of the adjacent elements 26 and 28. The drive shaft 32 is journalled in any suitable bearing means mounted on the housing 24. The drive shaft 32 is drivably rotated by the engine 10 through a pulley 34 fixedly mounted on one end of the drive shaft 32.

Within the first stage element 26, a first rotor 36 having a plurality of vanes is fixedly mounted on the drive shaft 32 for compressing air drawn from the atmosphere. Within the second stage element 28, a second rotor 38 similar to the first rotor 36 is mounted on the drive shaft 32 for further compressing the air drawn from the first stage element 26.

The first stage element 26 has a first air intake port 40 on the top thereof for drawing in atmospheric air, a first air discharge port 42 and a second air discharge port 44 both on the bottom thereof. While the second stage element 28 has a third air discharge port 46 on the top thereof a second air intake port 48 is on the bottom thereof. The first discharge port 42 of the first stage element 26 communicates with the upstream of the oxidizing catalytic converter 18 by means of a first conduit 50 to supply secondary air into the catalytic converter 18. The second discharge port 44 of the first stage element 26 communicates with the second intake port 48 of the second stage element 28 by means of a connecting pipe 52 for submitting compressed air from the first stage element 26 into the second stage element 28. The third air discharge port 46 of the second stage element 28 communicates with the exhaust manifold 12 through a second conduit 54.

In operation, when the drive shaft 32 of the air pump 22 is rotated by the engine 10 through the drive pulley 34, both the first and second rotors 36 and 38 are driven to compress air from the atmosphere. Accordingly air drawn through the first air intake port 40 into the first stage element 26 is compressed by the first rotor 36, and the compressed air is discharged from the first discharge port 42 and the second air discharge port 44. The compressed air from the first discharge port 42 is submitted through the first conduit 50 located upstream of the oxidizing catalytic converter 18 which is subjected to relatively low back pressure of the exhaust gas. While the compressed air from the second discharge port 44 of the first stage element is submitted through the connecting pipe 52 into the second intake port 48 of the second stage element 28. The air submitted into the second stage element 28 is further compressed by the second rotor 38. The further compressed air is discharged through the second conduit 54 into the exhaust manifold 12 which is subjected to relatively high back pressure of the exhaust gas.

It is noted that a multi-stage air pump may be used for supplying the required amounts of secondary air into more than two portions of the exhaust gas system which are respectively subjected to various back pressures of the exhaust gas. The multi-stage elements are also in this case fluidly connected to each other in series. Accordingly the first stage element of the multi-stage pump will communicate with a portion which is subjected to the lowest exhaust gas back pressure within the exhaust system requiring secondary air, while the last stage element communicates with the portion which is subjected to the highest back pressure. It is also noted that the idea of the present invention can be applied to an exhaust purifying system not only equipped with catalytic converters but also equipped with thermal reactors.

What is claimed is:

1. An exhaust purifying system for an automotive internal combustion engine having an exhaust system, comprising:
a plurality of exhaust purifying devices disposed in the exhaust system, the exhaust system having a plurality of portions which are subjected to various back pressures of the exhaust gases from the engine due to the flow resistance by said exhaust purifying devices;
a multi-stage air pump for supplying secondary air required by said exhaust purifying devices, including a housing defining a chamber therein, partition means for separating said chamber into a plurality of chambers which are adjacent to each other, said plurality of chambers being communicated with said plurality of portions through a plurality of conduits, respectively, a plurality of rotors disposed within said plurality of chambers, respectively, a drive shaft for simultaneously driving said plurality of rotors, connecting pipe means for fluidly connecting said plurality of chambers in series one after another for progressively increasing the pressure of air delivered to at least one of said conduits from at least one of said chambers.

2. An exhaust purifying system for an automotive internal combustion engine having an exhaust manifold adapted to purify the exhaust gas, comprising:
a reducing catalytic converter connected downstream of the exhaust manifold;
an oxidizing catalytic converter connected through conduit means downstream of said reducing catalytic converter;
a two-stage air pump supplying secondary air required by said exhaust manifold and said oxidizing catalytic converter, including a housing defining a chamber therein, a partition for separating the chamber into a first chamber and a second chamber, said first chamber having an air intake port communicating with atmosphere, an air discharge port communicating through a first conduit with said conduit means upstream of said oxidizing catalytic converter and downstream of said reducing catalytic converter, said second chamber having an air discharge port communicating through a second conduit with the exhaust manifold which is subjected to a back pressure higher than said portion upstream of said oxidizing catalytic converter, a connecting pipe for connecting said first chamber to said second chamber for progressively increasing the pressure of air introducing from said first chamber into said second chamber, first and second rotors rotatably disposed within said first and second chambers, respectively, a drive shaft for simultaneously driving said first and second rotors from said engine, said drive shaft being rotatably disposed parallel to the longitudinal axis of said first and second chambers.

* * * * *